United States Patent
Levi et al.

(10) Patent No.: US 10,241,982 B2
(45) Date of Patent: Mar. 26, 2019

(54) MODIFYING WEB PAGES BASED UPON IMPORTANCE RATINGS AND BANDWIDTH

(71) Applicant: HEWLETT PACKARD ENTERPRISE DEVELOPMENT LP, Houston, TX (US)

(72) Inventors: Elad Levi, Yehud (IL); Avigad Mizrahi, Yehud (IL); Ran Bar Zik, Yehud (IL)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/326,155

(22) PCT Filed: Jul. 30, 2014

(86) PCT No.: PCT/US2014/048849
§ 371 (c)(1),
(2) Date: Jan. 13, 2017

(87) PCT Pub. No.: WO2016/018291
PCT Pub. Date: Feb. 4, 2016

(65) Prior Publication Data
US 2017/0206187 A1 Jul. 20, 2017

(51) Int. Cl.
*G06F 17/00* (2006.01)
*G06F 17/22* (2006.01)
(Continued)

(52) U.S. Cl.
CPC ........ *G06F 17/2247* (2013.01); *G06F 16/958* (2019.01); *G06F 16/9535* (2019.01);
(Continued)

(58) Field of Classification Search
CPC ..................................................... G06F 17/211
See application file for complete search history.

(56) References Cited

U.S. PATENT DOCUMENTS 6,144,996 A * 11/2000 Starnes ............. G06F 17/30899
707/E17.119
6,243,761 B1 * 6/2001 Mogul .................... H04L 29/06
709/217
(Continued)

FOREIGN PATENT DOCUMENTS

EP 2670110 A1 12/2013

OTHER PUBLICATIONS

Informa UK Limited, "Content Delivery Networks: Market Dynamics and Growth Perspectives," (Research Paper), 2012, 12 pages, available at http://www.informatandm.com/wp-content/uploads/2012/10/CDN-whitepaper.pdf.
(Continued)

*Primary Examiner* — Laurie A Ries
(74) *Attorney, Agent, or Firm* — Hewlett Packard Enterprise Patent Department (57) ABSTRACT

In one example of the disclosure, a web page and a plurality of content elements that are candidates for incorporation into the web page are received. A user-assigned importance rating for each of the received content elements is received. A reduced-sized version of the content element is created for each of the received content elements. A web page request is received from a requestor computing device and bandwidth available to the device is measured. The web page is modified based upon the importance ratings and the bandwidth measurement.

20 Claims, 6 Drawing Sheets

(51) Int. Cl.
  *G06F 16/958* (2019.01)
  *G06F 16/9535* (2019.01)
  *G06F 17/21* (2006.01)
  *H04L 12/26* (2006.01)

(52) U.S. Cl.
  CPC ........ *G06F 17/211* (2013.01); *G06F 17/2288* (2013.01); *H04L 43/0894* (2013.01); *H04L 43/16* (2013.01)

(56) References Cited

U.S. PATENT DOCUMENTS

| | | | | |
|---|---|---|---|---|
| 7,770,200 | B2* | 8/2010 | Brooks | H04L 41/0896 725/105 |
| 8,055,685 | B2* | 11/2011 | Timmons | G06F 17/30979 707/803 |
| 8,166,509 | B2* | 4/2012 | Brooks | H04N 21/23439 725/105 |
| 8,316,124 | B1* | 11/2012 | Baumback | H04L 67/22 709/224 |
| 8,438,469 | B1* | 5/2013 | Scott | G06F 17/24 715/230 |
| 8,582,584 | B2* | 11/2013 | Rieger | H04L 41/0853 370/401 |
| 8,626,910 | B1* | 1/2014 | Lientz | H04L 41/0896 702/186 |
| 8,726,149 | B2* | 5/2014 | Bendelac | H04L 69/04 715/238 |
| 8,937,744 | B1* | 1/2015 | Shah | G06F 3/1219 358/1.2 |
| 9,386,119 | B2* | 7/2016 | Chetlur | H04L 67/306 |
| 9,588,632 | B1* | 3/2017 | Amacker | G06F 3/048 |
| 9,614,889 | B2* | 4/2017 | Ehrich | H04L 67/02 |
| 2001/0010059 | A1* | 7/2001 | Burman | G06F 11/3419 709/224 |
| 2004/0015777 | A1* | 1/2004 | Lei | G06F 17/30899 715/234 |
| 2005/0071757 | A1* | 3/2005 | Ehrich | G06F 17/3089 715/234 |
| 2007/0118802 | A1* | 5/2007 | Gerace | G06F 17/30867 715/738 |
| 2007/0220010 | A1* | 9/2007 | Ertugrul | G06F 17/30867 |
| 2007/0283036 | A1* | 12/2007 | Dey | H04L 43/106 709/233 |
| 2009/0125413 | A1* | 5/2009 | Le Chevalier | G06Q 30/06 705/26.1 |
| 2009/0182815 | A1* | 7/2009 | Czechowski, III | H04L 67/104 709/206 |
| 2009/0265611 | A1* | 10/2009 | Sengamedu | G06F 17/211 715/234 |
| 2011/0138064 | A1* | 6/2011 | Rieger | G06F 17/30905 709/228 |
| 2013/0238777 | A1* | 9/2013 | Raleigh | H04L 67/1097 709/223 |
| 2013/0246323 | A1* | 9/2013 | Athas | G06N 5/02 706/46 |
| 2014/0040721 | A1* | 2/2014 | Brownlow | G06F 17/24 715/234 |
| 2014/0122711 | A1* | 5/2014 | Lientz | H04L 41/0896 709/224 |
| 2014/0304583 | A1* | 10/2014 | Fabbri | G06F 17/3089 715/234 |
| 2014/0335877 | A1* | 11/2014 | Roberts | H04W 72/0486 455/452.1 |
| 2015/0019545 | A1* | 1/2015 | Chedeau | G06F 17/211 707/725 |
| 2015/0269160 | A1* | 9/2015 | Babaian | G06F 17/30038 707/751 |
| 2015/0326694 | A1* | 11/2015 | Westberg | H04L 67/2823 709/203 |
| 2017/0201445 | A1* | 7/2017 | Chaudhry | H04L 43/0876 |
| 2018/0011935 | A1* | 1/2018 | Mizuno | G06F 17/30867 |

OTHER PUBLICATIONS

International Search Report & Written Opinion received in PCT Application No. PCT/US2014/048849, dated Apr. 1, 2015, 15 pages.
Shevade, U. et al., "Enabling High-bandwidth Vehicular Content Distribution," (Research Paper), Proceedings of the 6th International Conference, ACM, 2010, 12 pages, available at http://conferences.sigcomm.org/co-next/2010/CoNEXT_papers/23-Shevade.pdf.
Sivasubramanian, S., "Scalable Hosting of Web Applications," (Research Paper), Apr. 18, 2007, 232 pages, available at http://dare.ubvu.vu.nl/bitstream/handle/1871/10753/7925?sequence=1.
Wikipedia, "Mobile Internet growth", available online at <https://en.wikipedia.org/wiki/Mobile_Internet_growth>, Apr. 1, 2016, 2 pages.
Coffin, Drew, "Image Formats: What's the Difference Between JPG, GIF, PNG?", Apr. 15, 2010, 6 pages.
Beamr Ltd., "JPEGMini", 2016, 3 pages.
"Photoshop: Digital Graphics", Lecture 6, 2014, 3 pages.
"Image size standard examples", 2013, 3 pages.
"Adaptive Image", Deliver small images to small devices, Dec. 2, 2016, 5 pages.

* cited by examiner

MODIFYING WEB PAGES BASED UPON IMPORTANCE RATINGS AND BANDWIDTH

BACKGROUND

Usage of mobile computing devices, such as smart phones, tablets, e-readers, GPS systems, video games and wireless home appliances, to access the internet is growing exponentially. Factors contributing to the rapid growth include proliferation of better devices and mobile applications, availability of better data coverage, increased mobile e-commerce, and a trend towards increased storage of personal content in the cloud.

DETAILED DESCRIPTION

Introduction

Content hosting services can provide via the internet content to be consumed by mobile computing devices. Such content can be provided via web pages, and via web applications enabled by the web pages. These web pages may include HTML, Cascading Style Sheets, JavaScript, and content elements such as images, videos, and fonts.

However, the images, videos and other content elements can take up much of the internet bandwidth available to users of the mobile computing devices. Users that are experiencing unreliable internet quality, e.g., due to distance from a cellular cell, atmospheric interferences, constraints of the client device or provider, network load, etc., may experience very fast internet connection for one moment and low bandwidth connection the next moment. Such occurrences diminish the experience for the mobile device user, and will likely result in the user decreasing his or her usage of the web pages and hosted web applications that are slow or inconsistent in uploading and execution due to the high bandwidth content.

To address these issues, various embodiments described in more detail below provide a system and a method to enable modification of web pages based upon importance ratings and bandwidth measurements. In an example, a web page, and a plurality of content elements as candidates for incorporation into the web page, are received. A user-assigned importance rating for each of the received content elements is received. For each of the received content elements, a reduced-sized version of the content element, smaller than the content element as received, is created. A web page request is received from a requestor computing device and bandwidth available to the requestor computing device is measured. The web page is modified based upon the importance rating and the bandwidth measurement.

In examples, a predetermined importance rating threshold for identifying high priority candidate content elements is accessed, and the web page is modified by including a subset of the plurality of content elements having a rating exceeding the importance rating threshold. The subset of content elements that is included in the web page is a mix of as-received size content elements and modified-size content elements, such that the cumulative size of the subset content elements does not exceed a predetermined size limit for the subset that correlates with the measured bandwidth.

In examples, responsive to determining the bandwidth measurement is below a pre-established bandwidth threshold, the web page is modified by incorporating all reduced-sized versions of content elements. In another example, a predetermined importance rating threshold for identifying high priority content elements is accessed, high priority content elements are identified according to the importance ratings and the importance rating threshold, and the web page is modified such that each of the high priority content elements is incorporated at the as-received resolution.

In examples, the web page that is modified is a responsive design web page that is adaptable such that the layout of the web page will vary according to the device-type of the requestor computing device. In an example, the responsive design web page includes design information indicating a number of the plurality of candidate content elements to be included in the web page. In examples, reduced-sized versions of image and/or video content elements are created, to be smaller than the content elements as received, by resizing, changing color depth of, or changing encoding of the content elements as received.

In examples, the web page that is modified as described in the preceding paragraph is a second web page, and the measurement of bandwidth is determined based upon a sending of a first web page to the requestor computing device in advance of the second web page. In other examples, bandwidth is measured responsive to a determination that a first attempt to load the web page at the requestor computing device failed to occur within a predetermined loading duration, and wherein the modification engine sends the modified web page to the requestor computing device as a second attempt.

In this manner, examples described herein may present an automated and efficient manner for application development teams to adapt web pages for users with unstable or low bandwidth connections, Disclosed examples will enable internet hosting providers to create low or medium bandwidth versions of resources and serve them to users dynamically according to the bandwidth measurements and user-assigned importance ratings, allowing for changes to the resource even in the middle of the web page loading. Examples described herein may further help users and developers to deal with unstable or low internet connection in a way that does not require user action and enables positive user experiences. Developer-user satisfaction with development software programs and other development products and services that utilize the examples described herein should increase. Likewise, consumer-user satisfaction with the software programs developed utilizing the examples described herein, and with the computing devices upon which such software programs are executed or displayed, should increase.

The following description is broken into sections. The first, labeled "Environment," describes an environment in which various embodiments may be implemented. The second section, labeled "Components," describes examples of various physical and logical components for implementing various embodiments. The third section, labeled "Illustrative Example," presents an example of modifying web pages based upon importance ratings and bandwidth. The fourth section, labeled "Operation," describes steps taken to implement various embodiments.

Environment

Figure 1:
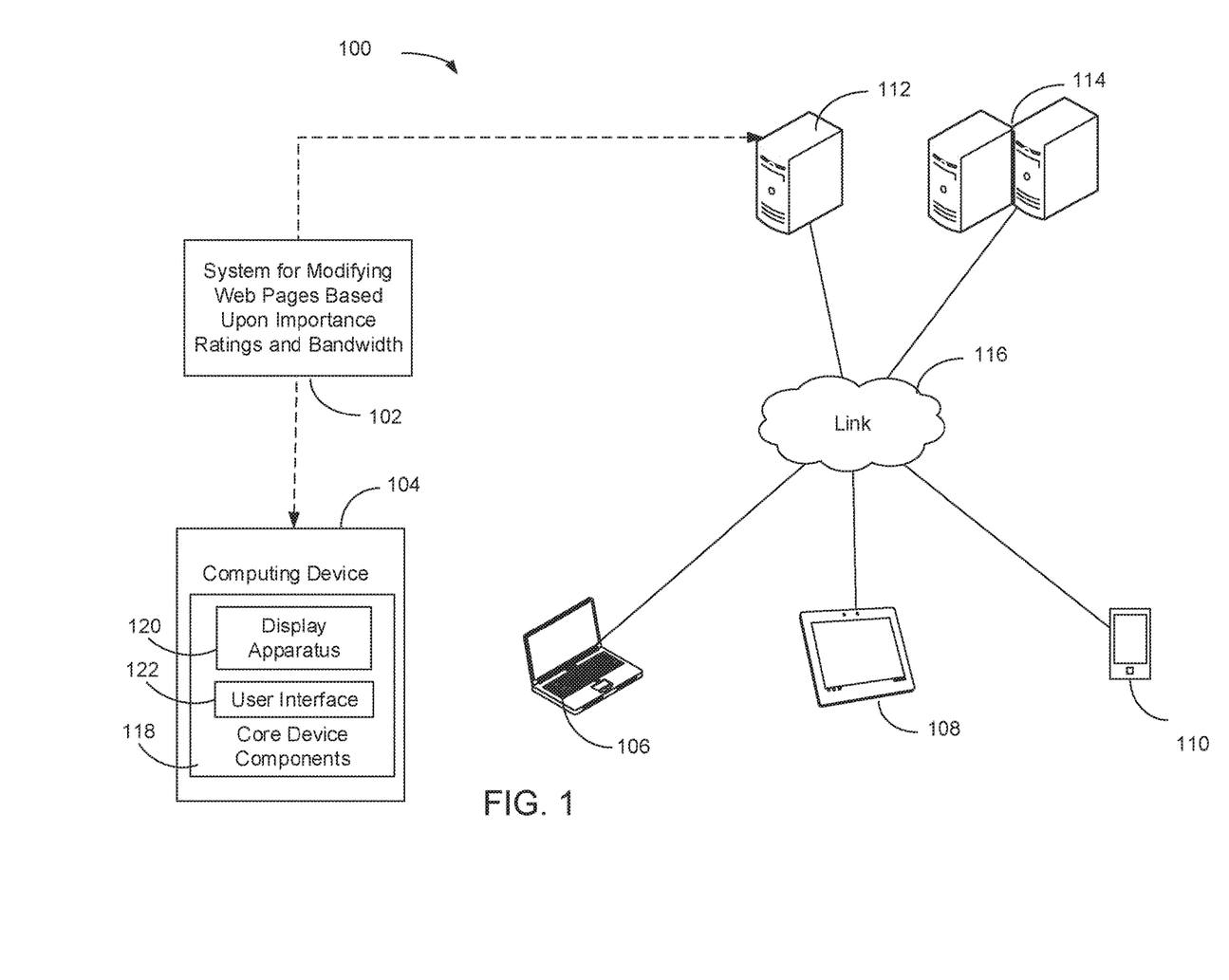
FIG. 1 is a block diagram depicting an example environment in which various embodiments may be implemented.

FIG. 1 depicts an example environment 100 in which embodiments may be implemented as a system 102 to modify web pages based upon importance ratings and bandwidth. Environment 100 is show to include computing device 104, client devices 106, 108, and 110, server device 112, and server devices 114. Components 104-114 are interconnected via link 116.

Link 116 represents generally any infrastructure or combination of infrastructures configured to enable an electronic connection, wireless connection, other connection, or combination thereof, to enable data communication between components 104 106 108 110 112 114. Such infrastructure or infrastructures may include, but are not limited to, one or more of a cable, wireless, fiber optic, or remote connections via telecommunication link, an infrared link, or a radio frequency link. For example, link 116 may represent the Internet, one or more intranets, and any intermediate routers, switches, and other interfaces. As used herein an "electronic connection" refers generally to a transfer of data between components, e.g., between two computing devices, that are connected by an electrical conductor. A "wireless connection" refers generally to a transfer of data between two components, e.g., between two computing devices, that are not directly connected by an electrical conductor. A wireless connection may be via a wireless communication protocol or wireless standard for exchanging data.

Client devices 106-110 represent generally any computing device with which a user may interact to communicate with other client devices, server device 112, and/or server devices 114 via link 116. Server device 112 represents generally any computing device configured to serve an application and corresponding data for consumption by components 104-110. Server devices 114 represent generally a group of computing devices collectively configured to serve an application and corresponding data for consumption by components 104-110.

Computing device 104 represents generally any computing device with which a user may interact to communicate with client devices 106-110, server device 112, and/or server devices 114 via link 116. Computing device 104 is shown to include core device components 118. Core device components 118 represent generally the hardware and programming for providing the computing functions for which device 104 is designed. Such hardware can include a processor and memory, a display apparatus 120, and a user interface 122. The programming can include an operating system and applications. Display apparatus 120 represents generally any combination of hardware and programming configured to exhibit or present a message, image, view, or other presentation for perception by a user, and can include, but is not limited to, a visual, tactile or auditory display. In examples, the display apparatus 120 may be or include a monitor, a touchscreen, a projection device, a touch/sensory display device, or a speaker. User interface 122 represents generally any combination of hardware and programming configured to enable interaction between a user and device 104 such that the user may effect operation or control of device 104. In examples, user interface 122 may be, or include, a keyboard, keypad, or a mouse. In some examples, the functionality of display apparatus 120 and user interface 122 may be combined, as in the case of a touchscreen apparatus that may enable presentation of images at device 104, and that also may enable a user to operate or control functionality of device 104.

System 102, discussed in more detail below, represents generally a combination of hardware and programming configured to enable modification of web pages based upon importance ratings and bandwidth. System 102 is to receive a web page and a plurality of content elements as candidates for incorporation into the web page. System 102 is to receive a user-assigned importance rating for each of the received content elements, and, for each of the received content elements, create a reduced-sized version of the content element that is smaller than the content element as received. System 102 is to receive a web page request from a requestor computing device and measure the network bandwidth available to the device. System 102 is to modify the web page based upon the user-supplied importance ratings and the bandwidth measurement.

In some examples, system 102 may be wholly integrated within core device components 118. In other examples, system 102 may be implemented as a component of any of computing device 104, client devices 106-110, server device 112, or server devices 114 where it may take action based in part on data received from core device components 118 via link 116. In other examples, system 102 may be distributed across computing device 104, and any of client devices 106-110, server device 112, or server devices 114. In a particular example, components that implement receiving a web page and a set of content elements as candidates for incorporation into the web page, receiving a user-assigned importance rating for each of the received content elements, and creating a reduced-sized versions of the content elements that are smaller than the content elements as received, may be included within a server device 112. Continuing with this particular example, components that implement receiving a web page request from a requestor computing device, and measuring bandwidth available to the device, and modifying the web page based upon the importance ratings and the bandwidth measurement may be components included within computing device 104. Other distributions of system across computing device 104, client devices 106-110, server device 112, and server devices 114 are possible and contemplated by this disclosure. It is noted that all or portions of the system 102 to modify web pages based upon importance ratings and bandwidth may also be included on client devices 106, 108 or 110.

Components

Figure 2:
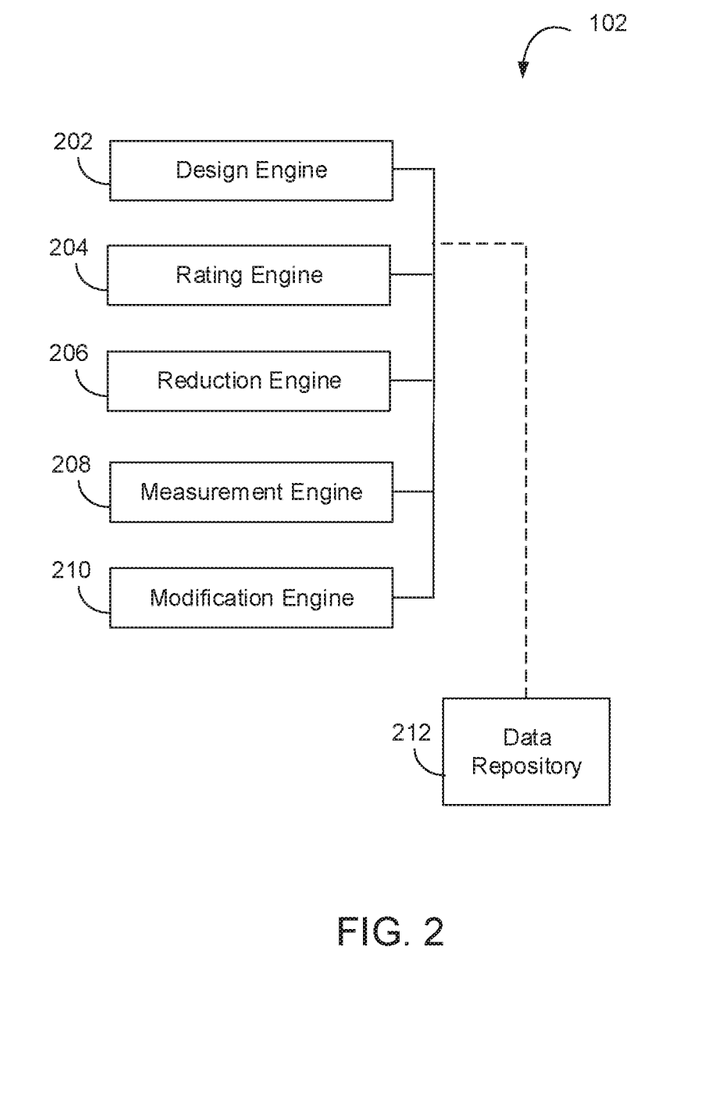
FIG. 2 is a block diagram depicting an example of a system to modify web pages based upon importance ratings and bandwidth.
Figure 3:
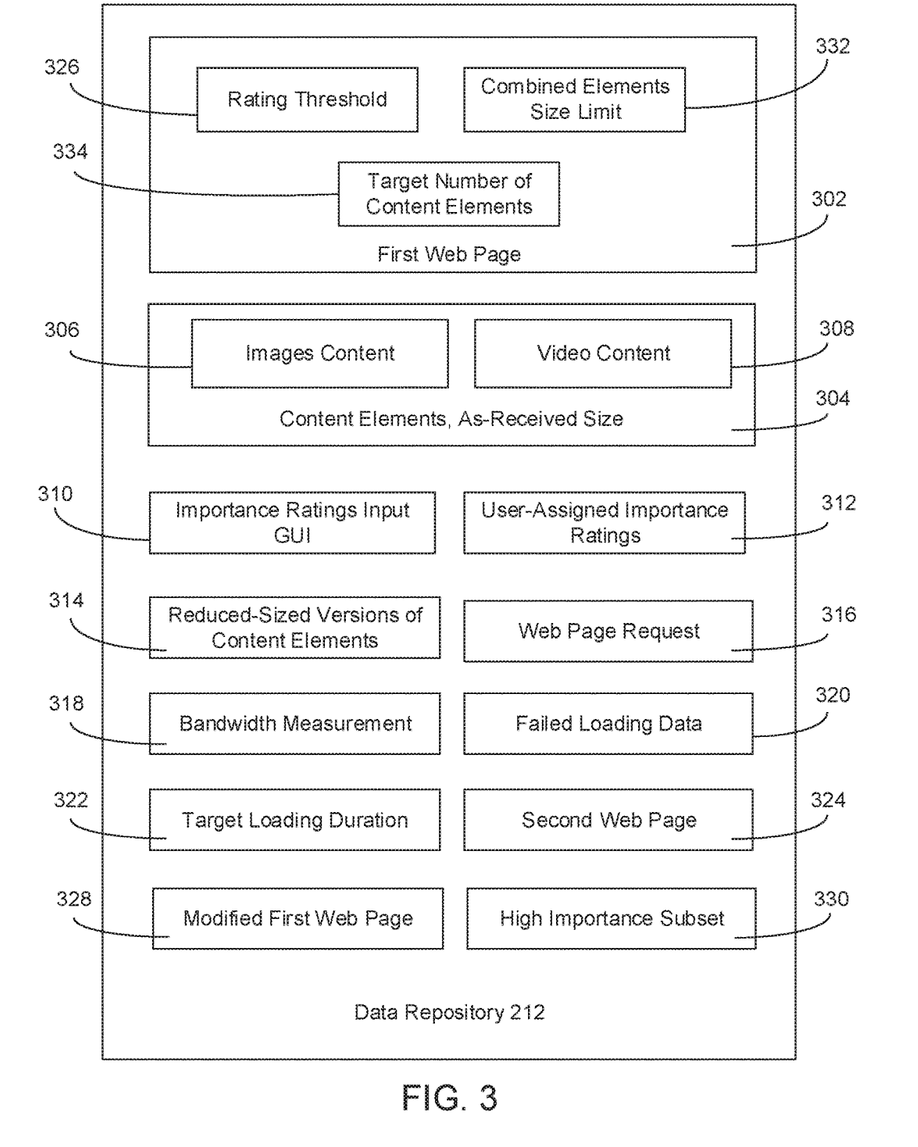
FIG. 3 is a block diagram depicting an example data structure for a system to modify web pages based upon importance ratings and bandwidth.
Figure 4:
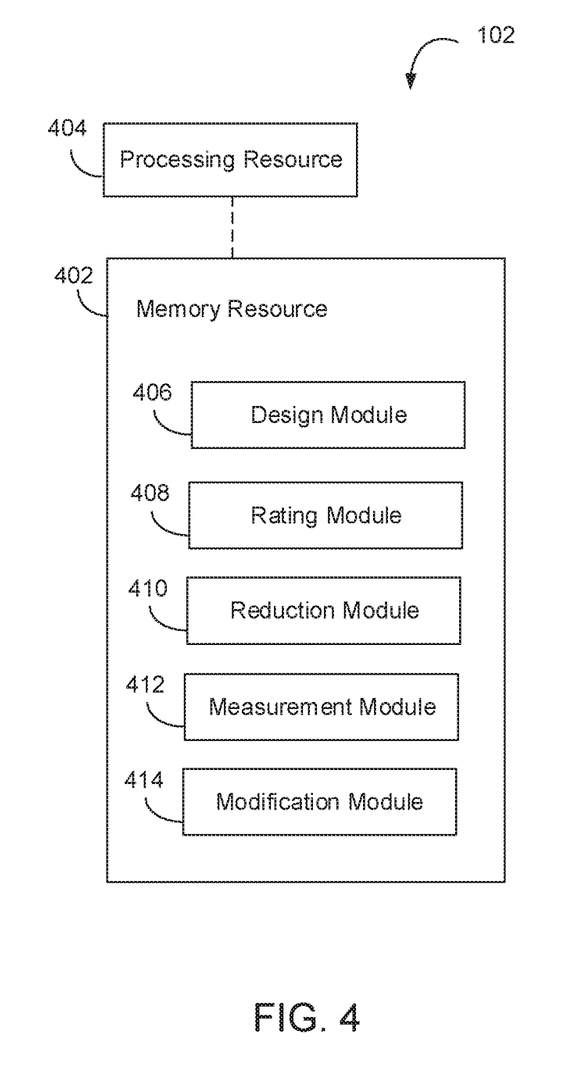
FIG. 4 is a block diagram depicting a memory resource and a processing resource according to an example.

FIGS. 2, 3, and 4 depict examples of physical and logical components for implementing various embodiments. In FIG. 2 various components are identified as engines 202 204 206 208 210. In describing engines 202 204 206 208 210 focus is on each engine's designated function. However, the term engine, as used herein, refers generally to a combination of hardware and programming configured to perform a designated function. As is illustrated later with respect to FIG. 4, the hardware of each engine, for example, may include one or both of a processor and a memory, while the programming may be code stored on that memory and executable by the processor to perform the designated function.

FIG. 2 is a block diagram depicting components of a system 102 to modify web pages based upon importance ratings and bandwidth. In this example, system 102 includes design engine 202, rating engine 204, reduction engine 206, measurement engine 208, and modification engine 210. In performing their respective functions, engines 202 204 206 208 210 may access data repository 212. Repository 212 represents generally any memory accessible to system 102 that can be used to store and retrieve data. In an example, design engine 202 represents generally a combination of hardware and programming configured to receive a web page and a plurality of content elements as candidates for incorporation into the web page. As used herein, a "web page" refers generally to a computer file or document that incorporates or references content elements and programming for hyperlinks. In examples, a "web page" may include or enable a "web application." As used herein, a "web application" refers generally to a computer software application that is coded in a browser-supported language (such as XML, HTML, or HTML with JavaScript) and is reliant on a web browser application to render the application executable or presentable. Examples of web pages that may include or facilitate web applications are webmail pages, online search engine pages, online sale pages, auction sites pages, and wiki pages.

As used herein, a "content element" refers generally to any content element that is displayable at a display device as or after the web page is interpreted by a web browser. Content elements may be or include, but are not limited to, style sheets, scripts, images, and videos. As used herein, a "hyperlink" refers generally to a reference to a certain content elements of a web page that, when activated or interacted with via user interaction (including but not limited to, clicking on, depressing, or hovering over the hyperlink content element via a user interface device), causes display of new or additional content. In examples, new content that the hyperlink points to may be a new web page, a specific content element within a new web page, or a specific content element or set of content elements within a currently displayed web page.

In a particular example, the web page is a responsive design web page, and the received content elements include image or video content elements. As used herein, a "responsive design web page" refers generally to a web page that has been coded or designed to for automatic adjustment of positioning of content elements or adjustment of relative proportions of content elements to provide an optimal viewing experience for various display devices, e.g., to provide for readability and easy navigation with a minimum of resizing, panning, and scrolling. In examples, design engine 202 may determine a type of display device and adjust positioning or relative proportions of content elements according to the type or dimensions of the determined display device type. In other examples, design engine 202 may determine a type of computing device (e.g., a smart phone, laptop computer, or desktop computer with monitor, etc.) that is requesting or accessing the web page, and adjust positioning or relative proportions of content elements according to the type of computing device requesting or accessing the web page.

Rating engine 204 represents generally a combination of hardware and programming configured to receive a user-assigned importance rating for each of the received content elements. In examples, the rating engine 204 is to provide, to a graphic user interface ("GUI") to be used by the user to input the importance ratings for the content elements. As used herein, a graphic user interface, or "GUI", refers generally to any type of display caused by an application that can enable a user to interact with the application via visual properties of the display. As used herein, an "importance rating" refers generally to any ranking, a score, a grade, a value, or other comparative assessment of importance of a content element relative to other content elements. In examples, an importance rating may be or include an importance rating within established range (e.g., "an importance rating between "x and "y"), wherein "x" and "y" are integers and "y" has a value greater than "x."

In one example, the importance rating methodology may be:

Importance Rating (IR) is a value in the range of 0-1 that indicates the import of the item.

In this example, items with value 1 may be deemed the most important while items with a lower value (e.g., "0.3") may be deemed less important. For instance, left side images that are to be displayed as a side bar menu may receive a value of "1", while other items on the web page may receive lower rankings such as "0.3", "0.7", etc.).

In other examples, an importance rating may be or include a numerical score (e.g., 90%), a letter grade (e.g., "A"), or a pass/fail rating. In examples, importance rating methodologies may be (but are not limited to):

"A" or "95%<=X<=100%"—importance criteria are evaluated and a content element is evaluated to "A" or 95%<=X<=100% of a 100% importance criteria target, such that the content element is deemed very important;

"Pass" or "75%<=X<=100%"—importance criteria are evaluated and a content element is evaluated to 75%<=X<=100% of a 100% importance criteria target, such that the content element is deemed of importance;

"Fail" or "X<=75%"—importance criteria are evaluated and a content element is evaluated to "X<=75%" of a 100% importance criteria target, such that the content element is deemed of low importance.

Reduction engine 206 represents generally a combination of hardware and programming configured to, for each of the received content elements, create a reduced-sized version of the content element that is smaller than the content element as it was received. In examples, reduction engine 206 is to create reduced-sized versions of the content elements as received by at least one of resizing, changing color depth of, and changing encoding of one or more of the received content elements.

Measurement engine 208 represents generally a combination of hardware and programming configured to receive a web page request from a requestor computing device and measure bandwidth available to the device. As used herein "bandwidth" refers generally to a rate of data transfer across a network, e.g., a throughput rate that measures an amount of data that can be carried from one point to another in a given time period. In an example, bandwidth may be a bit rate measured in bits of data per second (bit/s). In an example, bandwidth may be a byte rate measured in bytes of data per second (B/s). In other examples, measurement engine 208 may operate to classify measurements of bandwidth with certain pre-established ranges as a "low bandwidth", "medium bandwidth", or "high bandwidth" situations. In an example, measurement engine 208 is to receive from a requestor computing device a request for a first web page that is to be modified, and is to determine the bandwidth measurement based upon the sending of a second web page that is distinct from the first web page. In another example, measurement engine 208 is to measure bandwidth responsive to a determination that a first attempt to load the requested web page at the requestor computing device failed to occur within a predetermined loading duration. Other measurement methodologies are possible and contemplated by this disclosure.

Modification engine 210 represents generally a combination of hardware and programming configured to modify the web page based upon the user-assigned importance ratings and the bandwidth measurement, and send the modified web page to the requestor computing device. In an example, modification engine 210 is to determine a number of content elements to be included within the modified web page, to determine a subset of the plurality of content elements that is the number of content elements from the plurality having high rankings according to a ranking methodology, and to modify the web page by including the subset. In an example, modification engine 210 may determine the number of content elements to be included in the modified web page based upon design information included within the web page.

In another example, modification engine 210 is to, in determining the subset of content elements with the high rankings according to a ranking methodology, create a mix of as-received size content elements and modified-size content elements such that the cumulative size of the subset does not exceed a predetermined size limit for the subset that corresponds with the measured bandwidth.

In another example, modification engine 210 is to select for inclusion in the web page a subset of the plurality of received content elements, with each member of the subset having an importance rating exceeding a predetermined importance rating threshold, and with the members of the subset cumulatively not exceeding a predetermined size limit corresponding to the measured bandwidth. In another example, modification engine 210 is to, responsive to determining the bandwidth measurement is below a pre-established bandwidth threshold, modify the web page by incorporating all reduced-sized versions of content elements.

In yet another example, modification engine 210 is to modify the web page to incorporate at as-received resolution or size all content that has been identified as high priority content. In this example, modification engine 210 is to access a predetermined importance rating threshold for the content elements, and to identify the high priority content elements according to the user-assigned importance ratings and the importance rating threshold.

In examples, design engine 202 may receive the web page and the plurality of content elements, rating engine 204 may receive the user-assigned importance ratings, measurement engine 208 may receive the web page request from a requestor computing device and measure bandwidth available to the device, and/or modification engine 210 may send the modified web page based to the requestor computing device via a networking protocol. In examples, the networking protocol may include, but is not limited to Transmission Control Protocol/Internet Protocol ("TCP/IP"), HyperText Transfer Protocol ("HTTP"), Simple Mail Transfer Protocol ("SMTP"), Extensible Messaging and Presence Protocol "XMPP") and/or Session Initiation Protocol ("SIP").

FIG. 3 depicts an example implementation of data repository 212. In this example, data repository 212 includes First Web Page 302, Received Content Elements 304, Images Content 306, Video Content 308, Importance Ratings Input GUI 310, User-Assigned Importance Ratings 312, Reduced-Sized Versions of Content Elements 314, Web Page Request 316, Bandwidth Measurement 318, Failed Loading Data 320, Target Loading Duration 322, Second Web Page 324, Rating Threshold 326, Modified First Web Page 328, High Importance Subset 330, Combined Elements Size Limit 332, and Target Number of Content Elements 334. Referring to FIG. 3 in view of FIG. 2, in one example, design engine 202 (FIG. 2) receives (e.g., via link 116, FIG. 1) a first web page 302 that is a responsive design web page. Design engine 202 additionally receives a set of content elements 304 as candidates for incorporation into the first web page 302. In this example, the set of content elements 304 includes image content 306 and video content 308 elements.

Continuing with the example data repository 212 of FIG. 3 in view of FIG. 2, rating engine 204 sends to an importance rating-provider computing device (e.g., server device 112, FIG. 1) a GUI 310 to be utilized by a user to input the importance ratings for the content elements. Rating engine 204 receives (e.g., via link 116, FIG. 1) a user-assigned importance rating 312 for each of the received content elements 304.

Continuing with the example data repository 212 of FIG. 3 in view of FIG. 2, reduction engine 206 creates, for each of the received content elements 304, a reduced-sized version 314 of the content element that is smaller than size of the content element as received 304. In examples, reduction engine 206 reduces size of the received image and/or video content elements 306 308 from the as-received size 304 by changing color depth, changing encoding of, subsampling, downsampling, or otherwise resizing to produce the reduced-size versions 314.

Continuing with the example data repository 212 of FIG. 3 in view of FIG. 2, measurement engine 208 receives (e.g., via link 116, FIG. 1) a web page request 316 from a requestor computing device (e.g., client device 106, FIG. 1) and measures bandwidth 318 available to the requestor computing device. In one example, measurement engine 208 receives failed loading data 320 indicative that an attempt to load the first web page 302 at the requestor computing device failed to occur within a predetermined target loading duration 322. In this example, measurement engine 208 determines the measurement of bandwidth 318 available to the requestor computing device based upon such failed loading data 320. In another example, measurement engine 208 sends a second web page 324, that is distinct from the first web page 302, to the requestor computing device, and determines the bandwidth measurement 318 based upon data indicative of time to send the second web page 324.

Continuing with the example data repository 212 of FIG. 3 in view of FIG. 2, modification engine 210 accesses a predetermined importance rating threshold 326 for identifying high priority content elements from within the received image and video content elements 304. Modification engine 210 modifies the first web page 302 to create a modified first web page 328 by including a high importance subset 330 of the received set 304 of content elements, wherein each content element of the high importance subset 330 has a user-assigned importance rating 312 that exceeds the pre-established importance rating threshold 326.

Continuing with the example data repository 212 of FIG. 3 in view of FIG. 2, in this example, the high importance subset 330 of content elements includes a mix of as-received size content elements 304 and reduced-sized versions 314 of the content elements such that the cumulative size of the high importance subset 330 of content elements does not exceed a predetermined combined elements size limit 332 for the subset 330 that corresponds to the measured bandwidth. In this example, modification engine 210 determines the high importance subset 330 in consideration of a target number 334 of content elements to be included within the first web page 302. In this example, the predetermined combined elements size limits, corresponding to measured bandwidths, for the high importance subset 330 and the target number 334 are stored within the first web page 302 for access by modification engine 210.

In the foregoing discussion of FIGS. 2-3, engines 202 204 206 208 210 were described as combinations of hardware and programming. Engines 202 204 206 208 210 may be implemented in a number of fashions. Looking at FIG. 4 the programming may be processor executable instructions stored on a tangible memory resource 402 and the hardware may include a processing resource 404 for executing those instructions. Thus memory resource 402 can be said to store program instructions that when executed by processing resource 404 implement system 102 of FIGS. 1 and 2.

Memory resource 402 represents generally any number of memory components capable of storing instructions that can be executed by processing resource 404. Memory resource 402 is non-transitory in the sense that it does not encompass a transitory signal but instead is made up of more or more memory components configured to store the relevant instructions. Memory resource 402 may be implemented in a single device or distributed across devices. Likewise, processing resource 404 represents any number of processors capable of executing instructions stored by memory resource 402. Processing resource 404 may be integrated in a single device or distributed across devices. Further, memory resource 402 may be fully or partially integrated in the same device as processing resource 404, or it may be separate but accessible to that device and processing resource 404.

In one example, the program instructions can be part of an installation package that when installed can be executed by processing resource 404 to implement system 102. In this case, memory resource 402 may be a portable medium such as a CD, DVD, or flash drive or a memory maintained by a server from which the installation package can be downloaded and installed. In another example, the program instructions may be part of an application or applications already installed. Here, memory resource 402 can include integrated memory such as a hard drive, solid state drive, or the like.

In FIG. 4, the executable program instructions stored in memory resource 402 are depicted as design module 406, rating module 408, reduction module 410, measurement module 412, and modification module 414. Design module 406 represents program instructions that when executed by processing resource 404 may perform any of the functionalities described above in relation to design engine 202 of FIG. 2. Rating module 408 represents program instructions that when executed by processing resource 404 may perform any of the functionalities described above in relation to rating engine 204 of FIG. 2. Reduction module 410 represents program instructions that when executed by processing resource 404 may perform any of the functionalities described above in relation to reduction engine 206 of FIG. 2. Measurement module 412 represents program instructions that when executed by processing resource 404 may perform any of the functionalities described above in relation to measurement engine 208 of FIG. 2. Modification module 414 represents program instructions that when executed by processing resource 404 may perform any of the functionalities described above in relation to modification engine 210 of FIG. 2.

Illustrative Example

Figure 5:
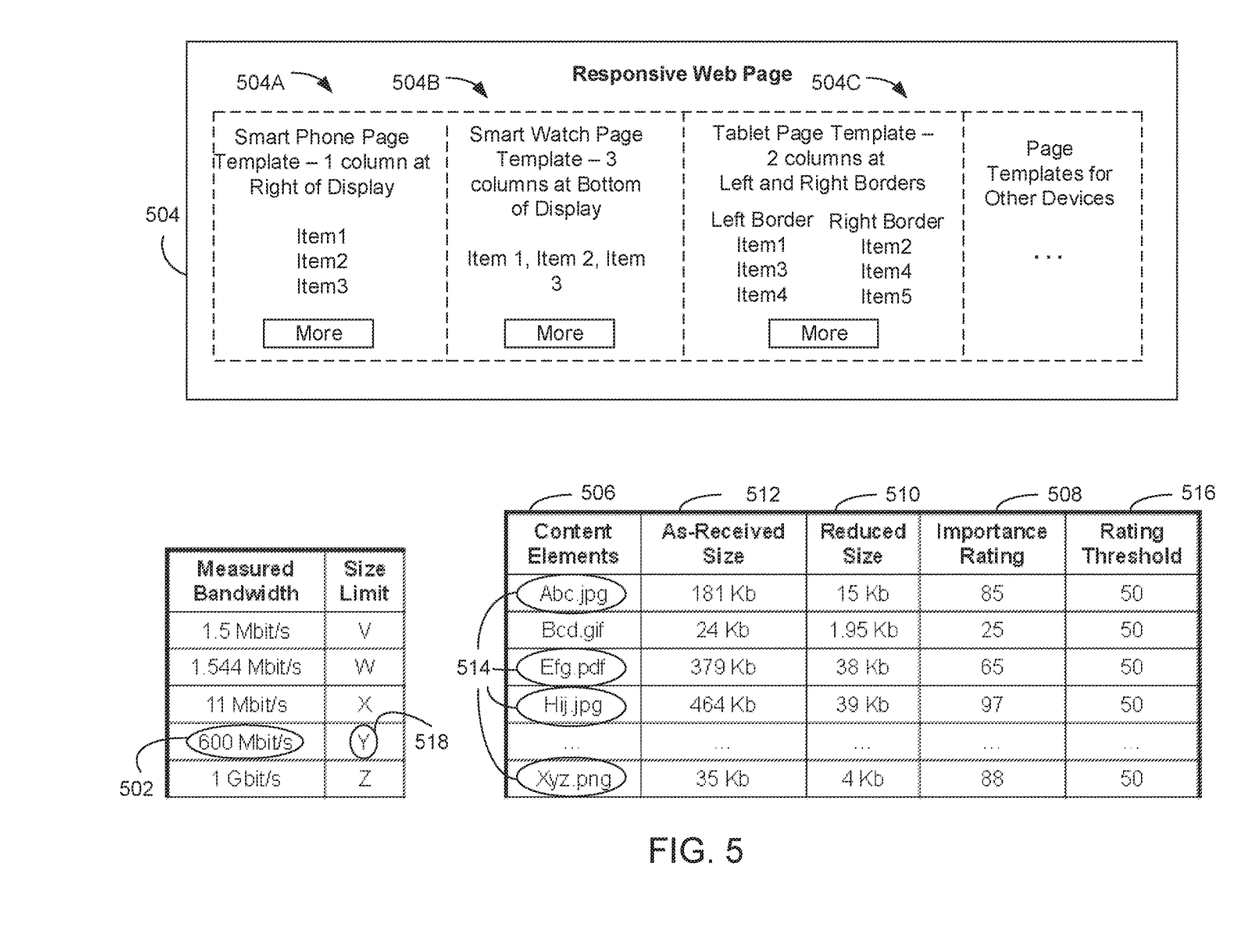
FIG. 5 illustrates an example of modifying web pages based upon importance ratings and bandwidth.

FIG. 5 illustrates an example of modifying web pages based upon importance ratings and bandwidth. In an example, system 102 (FIG. 2) sends, via a network 116 (FIG. 1), a first web page to a page-requestor computing device, and determines a measurement of bandwidth 502 available to the page-requestor computing device based upon the sending of the first web page.

System 102 receives, via a network 116 (FIG. 1), a second web page 504 that is a responsive design web page. Second web page 504 includes templates for display of content elements at various types of computing devices, including a smart phone display template 504A, a smart watch display template 504B, and a tablet display template 504C.

System 102 additionally receives, via a network 116 (FIG. 1), a set of content elements 506 that are candidates for incorporation into the second page 504, and a user-assigned importance rating 508 for each of the received content elements 506. System 102 creates, for each of the received content elements 506, a reduced-sized version 510 that is smaller than the content element's as-received size 512.

System 102 modifies the second web page 504 in consideration of the importance ratings 508 and the bandwidth measurement 502. In an example, system 102 may selects for inclusion in the second web page 504 a subset 514 of the set of content elements 506. In this example, each member of the subset 514 is selected according to the members having an importance rating 508 exceeding a predetermined importance rating threshold 516 of "50", and with the total size of the subset cumulatively not exceeding a predetermined size limit "Y" 518 that corresponds to the measured bandwidth 502.

Operation

Figure 6:
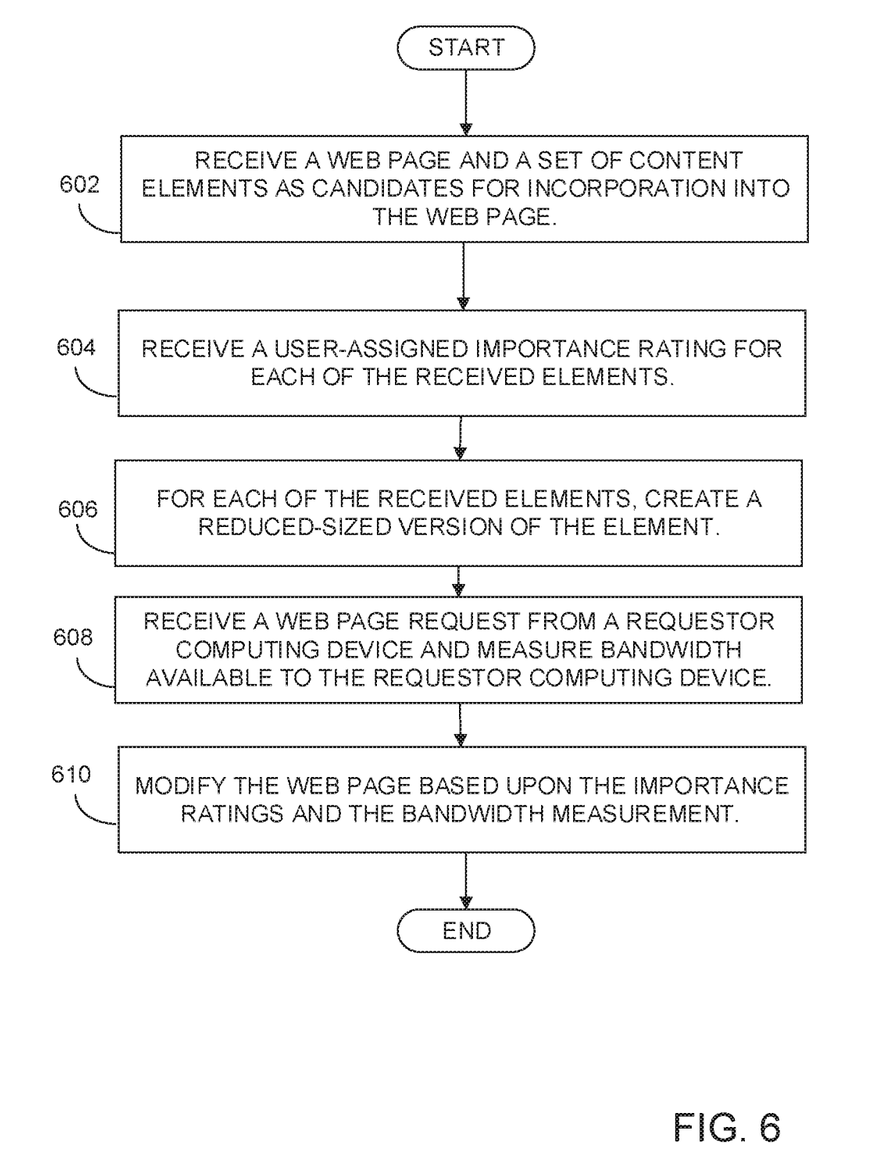
FIG. 6 is a flow diagram depicting steps taken to implement an example.

FIG. 6 is a flow diagram of steps taken to implement a method for modifying web pages based upon importance ratings and bandwidth. In discussing FIG. 6, reference may be made to the components depicted in FIGS. 2 and 4. Such reference is made to provide contextual examples and not to limit the manner in which the method depicted by FIG. 6 may be implemented. A web page and a set of content elements as candidates for incorporation into the web page are received (block 602). Referring back to FIGS. 2 and 4, design engine 202 (FIG. 2) or design module 406 (FIG. 4), when executed by processing resource 404, may be responsible for implementing block 602.

A user-assigned importance rating is received for each of the received content elements (block 604). Referring back to FIGS. 2 and 4, rating engine 204 (FIG. 2) or rating module 408 (FIG. 4), when executed by processing resource 404, may be responsible for implementing block 604.

A reduced-sized version of each of the received content elements is created (block 606). Referring back to FIGS. 2 and 4, reduction engine 206 (FIG. 2) or reduction module 410 (FIG. 4), when executed by processing resource 404, may be responsible for implementing block 606.

A web page request is received from a requestor computing device, and bandwidth available to the requestor computing device is measured (block 608). Referring back to FIGS. 2 and 4, measurement engine 208 (FIG. 2) or measurement module 412 (FIG. 4), when executed by processing resource 404, may be responsible for implementing block 608.

The web page is modified based upon the importance ratings and the bandwidth measurement (block 610). Referring back to FIGS. 2 and 4, modification engine 210 (FIG.

2) or modification module 414 (FIG. 4), when executed by processing resource 404, may be responsible for implementing block 610.

Conclusion

FIGS. 1-6 aid in depicting the architecture, functionality, and operation of various embodiments. In particular, FIGS. 1-4 depict various physical and logical components. Various components are defined at least in part as programs or programming. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s). Embodiments can be realized in any memory resource for use by or in connection with processing resource. A "processing resource" is an instruction execution system such as a computer/processor based system or an ASIC (Application Specific Integrated Circuit) or other system that can fetch or obtain instructions and data from computer-readable media and execute the instructions contained therein. A "memory resource" is any non-transitory storage media that can contain, store, or maintain programs and data for use by or in connection with the instruction execution system. The term "non-transitory" is used only to clarify that the term media, as used herein, does not encompass a signal. Thus, the memory resource can comprise any one of many physical media such as, for example, electronic, magnetic, optical, electromagnetic, or semiconductor media. More specific examples of suitable computer-readable media include, but are not limited to, hard drives, solid state drives, random access memory (RAM), read-only memory (ROM), erasable programmable read-only memory, flash drives, and portable compact discs.

Although the flow diagram of FIG. 6 shows a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims. All of the features disclosed in this specification (including any accompanying claims, abstract and drawings), and/or all of the steps of any method or process so disclosed, may be combined in any combination, except combinations where at least some of such features and/or steps are mutually exclusive.

What is claimed is:

1. A system, comprising:
   a design engine, to receive a web page and a plurality of content elements as candidates for incorporation into the web page;
   a rating engine, to receive a user-assigned importance rating for each of the received content elements;
   a reduction engine, to, for each of the received content elements, create a reduced-sized version of the content element;
   a measurement engine, to receive a web page request from a requestor computing device and measure bandwidth available to the device; and
   a modification engine, to:
      modify the web page based upon the importance ratings and the bandwidth measurement, the modification to include,
      determining a number of content elements to be included within the web page;
      determining a subset of the plurality of content elements that is the number of content elements from the plurality having high rankings according to a ranking methodology; and
      modifying the web page by including the subset.

2. The system of claim 1, wherein the web page is a responsive design web page and the content elements include image or a video content elements.

3. The system of claim 1, wherein the modification engine is to, in determining the subset, create a mix of as-received size content elements and modified-size content elements such that the cumulative size of the subset does not exceed a predetermined size limit for the subset.

4. The system of claim 1, wherein the modification engine is to determine the number of content elements to be included in the web page based upon design information included within the web page.

5. The system of claim 1, wherein the modification engine is to select for inclusion in the web page a subset of the plurality of content elements, each member of the subset having an importance rating exceeding a predetermined importance rating threshold, and the members of the subset cumulatively not exceeding a predetermined size limit for the subset that corresponds to the measured bandwidth.

6. The system of claim 1, wherein the modification engine is to, responsive to determining the bandwidth measurement is below a pre-established bandwidth threshold, modify the web page by incorporating all reduced-sized versions of content elements.

7. The system of claim 1, wherein the modification engine is to access a predetermined importance rating threshold, is to identify high priority content elements based upon the importance ratings and the importance rating threshold, and is to modify the web page such that each of the high priority content elements is incorporated at as-received resolution.

8. The system of claim 1, wherein the reduction engine is to create a reduced-sized version of a first content element that is smaller than the first content element as received by at least one of resizing, changing color depth of, and changing encoding of the first content element.

9. The system of claim 1, wherein the web page is a second web page, and the measurement engine is to send a first web page to the requestor computing device and determine the bandwidth measurement based upon the sending of the first web page.

10. The system of claim 1, wherein the measurement engine is to measure bandwidth based upon data indicative that an attempt to load the web page at the requestor computing device failed to occur within a target loading duration.

11. A memory resource storing instructions that when executed cause a processing resource to implement a system to modify web pages, the instructions comprising:
   a design module, to receive a responsive design web page and a plurality of content elements as candidates for incorporation into the web page;
   a rating module, to receive a user-assigned importance rating for each of the received content elements;

a reduction module, to, for each of the received content elements, create a reduced-sized version of the content element that is smaller than the content element as received;

a measurement module, to receive a web page request from a requestor computing device and measure bandwidth available to the device; and a modification module, to access a predetermined importance rating threshold for identifying high priority content elements, and to modify the web page by including a subset of the plurality of content elements with each content element of the subset having an importance rating exceeding the importance rating threshold, wherein the subset includes a mix of as-received size content elements and modified-size content elements such that the cumulative size of the subset content elements does not exceed a predetermined size limit for the subset that corresponds with the measured bandwidth.

12. The memory resource of claim 11, wherein the modification module includes instructions to modify the web page by including the subset to the exclusion of other content elements from the plurality of content elements.

13. The memory resource of claim 11, wherein the modification module is to determine the number of content elements to be included in the web page based upon design information included within the web page.

14. A method to modify web pages based upon content element importance ratings and bandwidth measurements, comprising:

sending a first web page to a page-requestor computing device, and determining a measurement of bandwidth available to the page-requestor computing device based upon the sending;

receiving a second web page that is a responsive design web page and a plurality of content elements as that are identified for incorporation into the second page;

receiving a user-assigned importance rating for each of the received content elements;

creating, for each of the received content elements, a reduced-sized version that is smaller than the content element as received;

modifying the second page in consideration of the ratings and the bandwidth measurement;

determining a number of content elements to be included within the web page;

determining a subset of the plurality of content elements that is the number of content elements from the plurality having high rankings according to a ranking methodology;

modifying the web page by including the subset; and sending the modified second page to the page-requestor computing device.

15. A system, comprising:

a design engine, to receive a web page and a plurality of content elements as candidates for incorporation into the web page;

a rating engine, to receive a user-assigned importance rating for each of the received content elements;

a reduction engine, to, for each of the received content elements, create a reduced-sized version of the content element;

a measurement engine, to receive a web page request from a requestor computing device and measure bandwidth available to the device; and a modification engine, to:

select for inclusion in the web page a subset of the plurality of content elements, each member of the subset having an importance rating exceeding a predetermined importance rating threshold, and the members of the subset cumulatively not exceeding a predetermined size limit for the subset that corresponds to the measured bandwidth; and modify the web page based upon the importance ratings and the bandwidth measurement.

16. The system of claim 15, wherein the modification engine is to, responsive to determining the bandwidth measurement is below a pre-established bandwidth threshold, modify the web page by incorporating all reduced-sized versions of content elements.

17. The system of claim 15, wherein the modification engine is to access a predetermined importance rating threshold, is to identify high priority content elements based upon the importance ratings and the importance rating threshold, and is to modify the web page such that each of the high priority content elements is incorporated at as-received resolution.

18. The system of claim 15, wherein the reduction engine is to create a reduced-sized version of a first content element that is smaller than the first content element as received by at least one of resizing, changing color depth of, and changing encoding of the first content element.

19. The system of claim 15, wherein the web page is a second web page, and the measurement engine is to send a first web page to the requestor computing device and determine the bandwidth measurement based upon the sending of the first web page.

20. The system of claim 15, wherein the measurement engine is to measure bandwidth based upon data indicative that an attempt to load the web page at the requestor computing device failed to occur within a target loading duration.

* * * * *